Feb. 22, 1966  W. BREY  3,237,199
TIRE BUILDING APPARATUS
Filed April 26, 1963  6 Sheets-Sheet 1
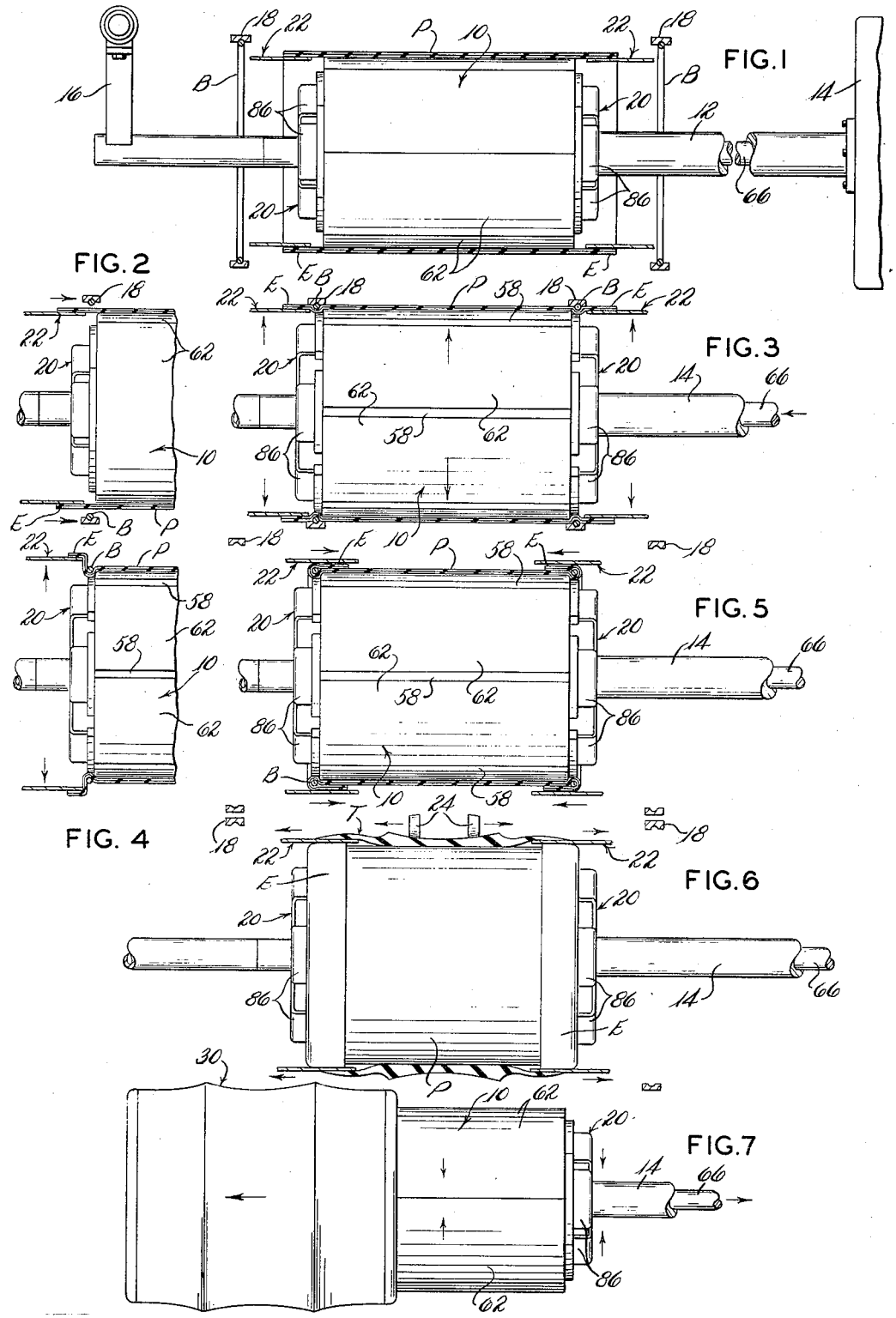

United States Patent Office 3,237,199
Patented Feb. 22, 1966

3,237,199
TIRE BUILDING APPARATUS
Wilhelm Brey, Cuyahoga Falls, Ohio, assignor to The Firestone Tire & Rubber Company, Akron, Ohio, a corporation of Ohio
Filed Apr. 26, 1963, Ser. No. 275,891
11 Claims. (Cl. 156—398)

This invention relates to a tire building apparatus for precision-built tires.

In its manufacture, a pneumatic tire is generally built up on a collapsible drum by placing thereon successive plies of rubberized fabric, locating tire beads at the lateral edges of the drum turning the ply ends around the beads, and placing a tread stock annulus around the plies to complete the assembly.

Positioning of these various components is extremely critical, for inaccuracy will invariably lead to an inferior tire having poor strength and riding qualities and short life.

It is therefore an object of this invention to provide a tire building apparatus for precision-built tires.

Another object is to provide a tire building apparatus having means to accurately align and manipulate the tire components.

Yet another object is to provide a tire building apparatus having means to very accurately position the tire beads concentrically with respect to the tire building drum.

Another object is to provide a tire building apparatus having bead locator segments radially expansible to register with the building drum segments.

Yet another object is to provide means at the ends of a tire building drum which, selectively, support the fabric ply ends, turn and stitch down said ends around tire beads in cooperation with bead locators, and assist in the stitching down of the tread.

These and other objects will become more apparent from reference to the following specification and drawings in which;

FIGURES 1 through 7 are somewhat diagrammatic views showing the progressive steps of assembling a tire on a building apparatus in accordance with the invention.

Operations

Figure 8:
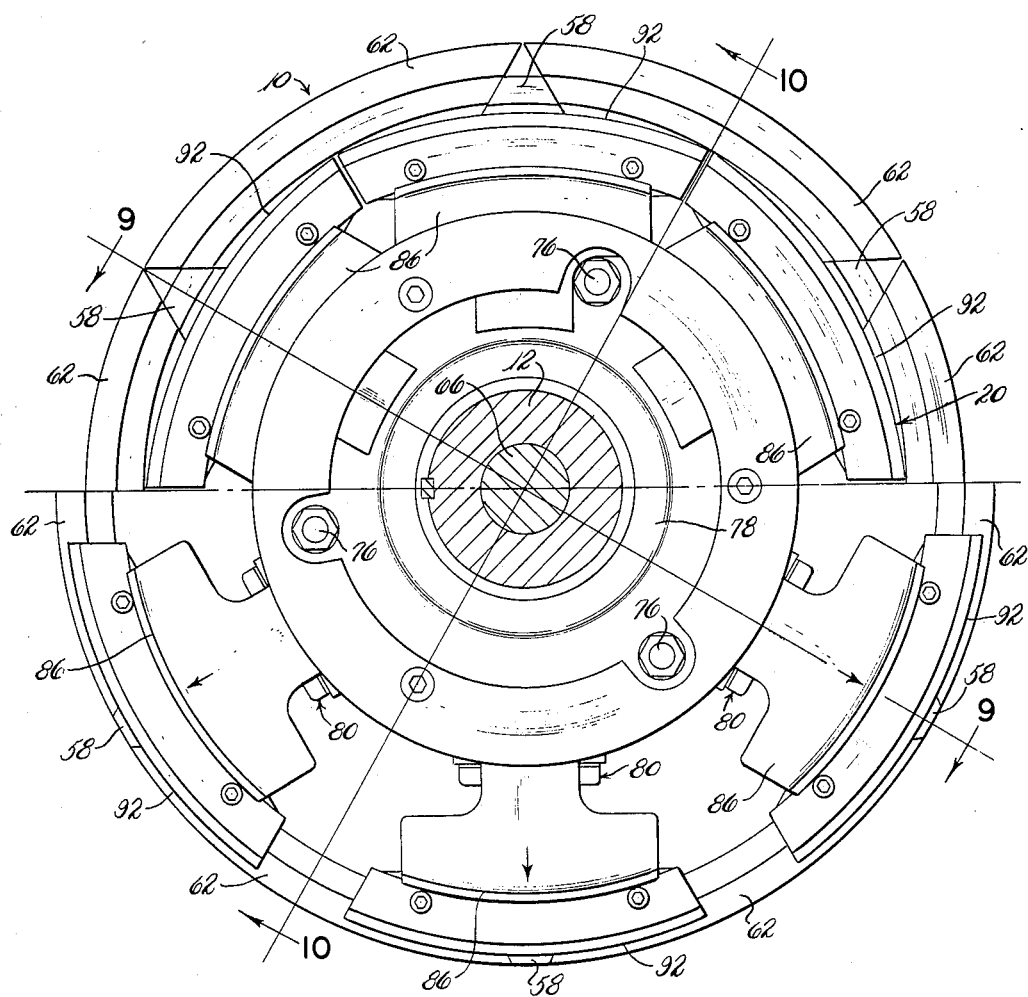
FIGURE 8 is an end elevation of the tire building drum of the invention with the portion of the drum above the centerline shown in contracted position and the portion below the centerline shown in expanded position.

Referring now to FIGURES 1–6, a tire building drum 10, is shown supported on a shaft 12 adapted for rotation by a conventional drive unit 14. At the opposite end of drum 10 is a support 16 adapted to be swung into and out of engagement with the drum shaft to allow for removal of a completed tire. At each end of the drum is provided a bead setting ring 18, a bead register means or ring assembly 20, and an assembly 22 of extension, stitch and turnover support ring segments 96; each, except the bead register means or ring assembly, is adapted for axial movement and for selective radial expansion and contraction, as helper means as will be fully explained hereafter. For the sake of simplicity, only the apparatus and operations at one end of the drum will be described.

In FIGURE 1, the drum 10 is shown in the collapsed position with tire body plies P in place thereon. The bead setting ring 18 is in contracted position and retains a tire bead B. The helper ring segments 96 are in contracted position adjacent the building drum 10, supporting the ends E of the plies P. Next, as shown in FIGURE 2, the bead setting ring 18 is moved axially inwardly to span the clearance between the lateral edge of the drum 10 and the ring segments 22.

The drum 10 and the helper ring segments 96 are next expanded, as shown in FIGURE 3, which urges the plies P radially outwardly beyond the bead at both sides thereof, to bear against the inner periphery of the tire bead B, while it is retained about its outer periphery by the bead setting ring 18. The bead register means or ring assembly 20 is simultaneously expanded until its segments 86 register accurately with the drum 10 and bear against the inside face of the plies P at the bead, thus forcing the bead into concentricity with the drum. The beads are now positively and accurately located axially as well as concentrically with the drum.

Bead setting ring 18 is then expanded and/or expanded and withdrawn and the helper ring segments 96 are expanded further as shown in FIGURE 4, thereby expanding further the ply edge E. Ring segments 96 are now moved axially inwardly to turn and stitch the edge E back over the bead B, as shown in FIGURE 5.

Next, as seen in FIGURE 6, a tread T is placed around the plies P, while the ring segments 96 are in their axially innermost positions and supporting the edge of the tread. The drum is now rotated at a high rate of speed, the ends of the ring segments 96 (because of their novel construction as will be explained), are pivoted radially outwardly to lift the tread edge portion and thus prevent entrapment of air as a pair of stitchers 24, 24, commence stitching the tread to the plies P from the center of the tread axially outwardly toward the edges of the drum 10. As each stitcher progresses toward the edge of the drum 10, the ring segments 96 are slowly withdrawn ahead of the stitcher.

The drum 10, register ring segments 20 and helper ring segments 96 are then collapsed, the support 16 is swung away from the shaft 12, and the assembled tire 30 is removed, see FIGURE 7.

Drum details

The drum 10 comprises a hub 40 fastened to shaft 12 by a key 42. End plates 44 and 46 confine the hub 40 against axial movement. The hub 40 has an enlarged central portion 48 and reduced end portions 50, 50. The central portion has secured therein pairs of guide posts 52, 52, and dowels 54. Slidably mounted on posts 52, 52 are cam follower blocks 56 which mount small drum segments 58 by bolts 59. Slidably mounted on dowels 54 are cam follower blocks 60 which mount large drum segments 62 by bolts 63. Radial expansion and contraction is imparted to the segments 58 and 62 through their respective cam follower blocks 56 and 60 by sets of axially moving cams 64 connected to a slidable shaft 66, housed within shaft 12, by pairs of bolts 68, 68 that extend through slots 70 in shaft 12 and in end portions 50, 50 of hub 40.

Figure 9:
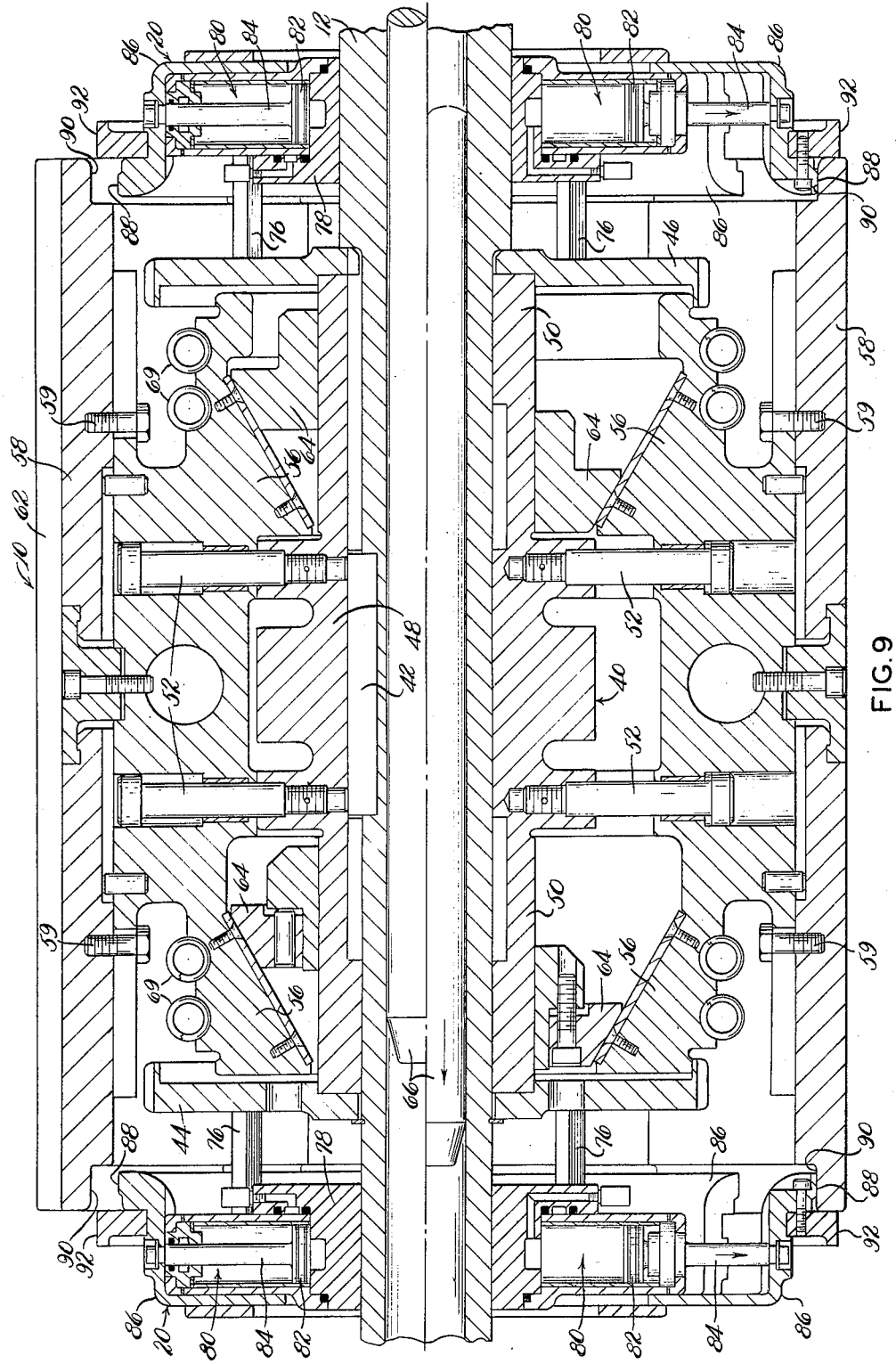
FIGURE 9 is a sectional view taken along line 9—9 of FIGURE 8 with the portion of the drum above the centerline shown in contracted position and the portion below the centerline shown in expanded position.
Figure 10:
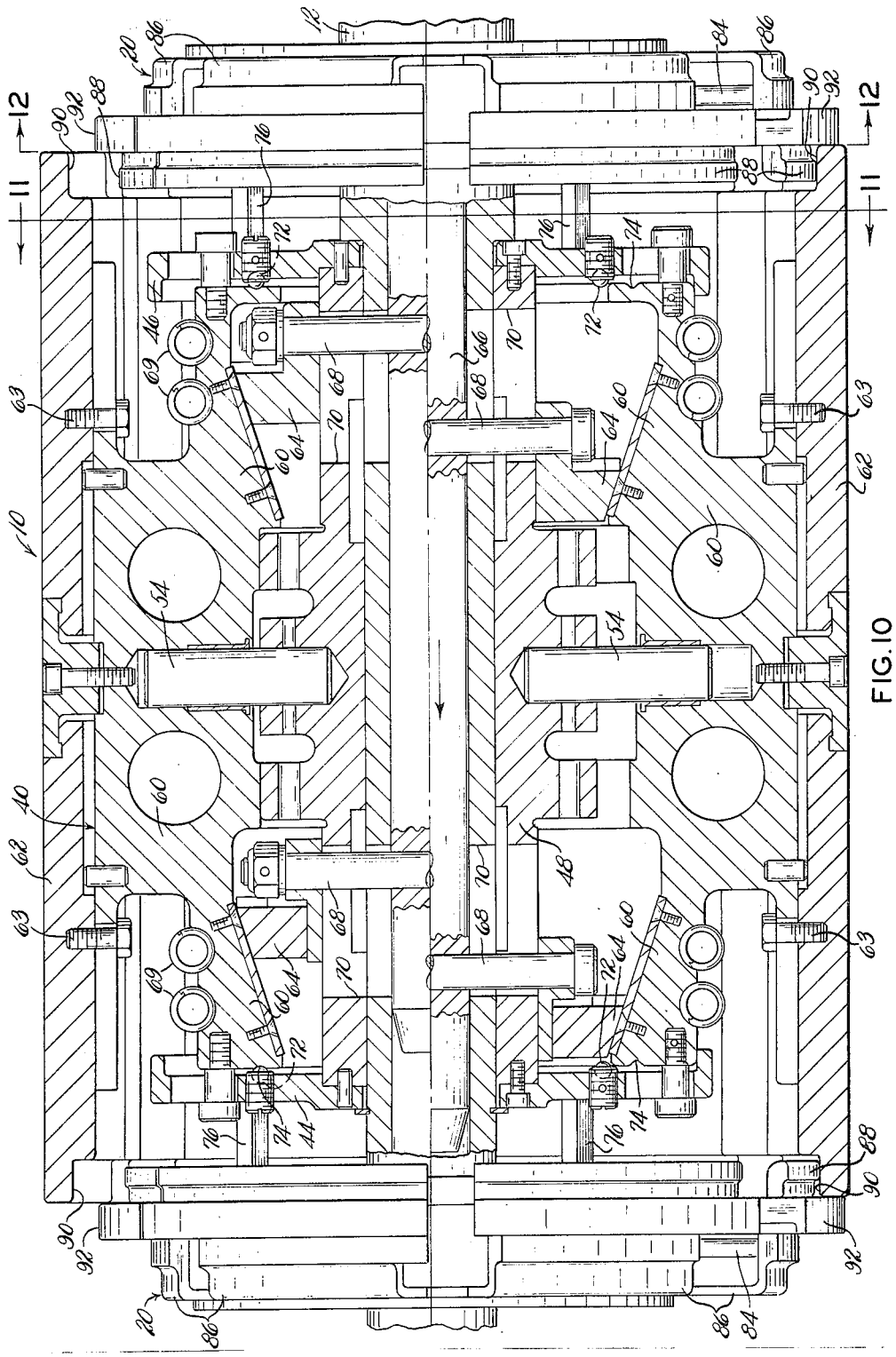
FIGURE 10 is a sectional view taken along line 10—10 of FIGURE 8 with the portion of the drum above the centerline shown in contracted position and the portion below the centerline shown in expanded position.
Figure 11:
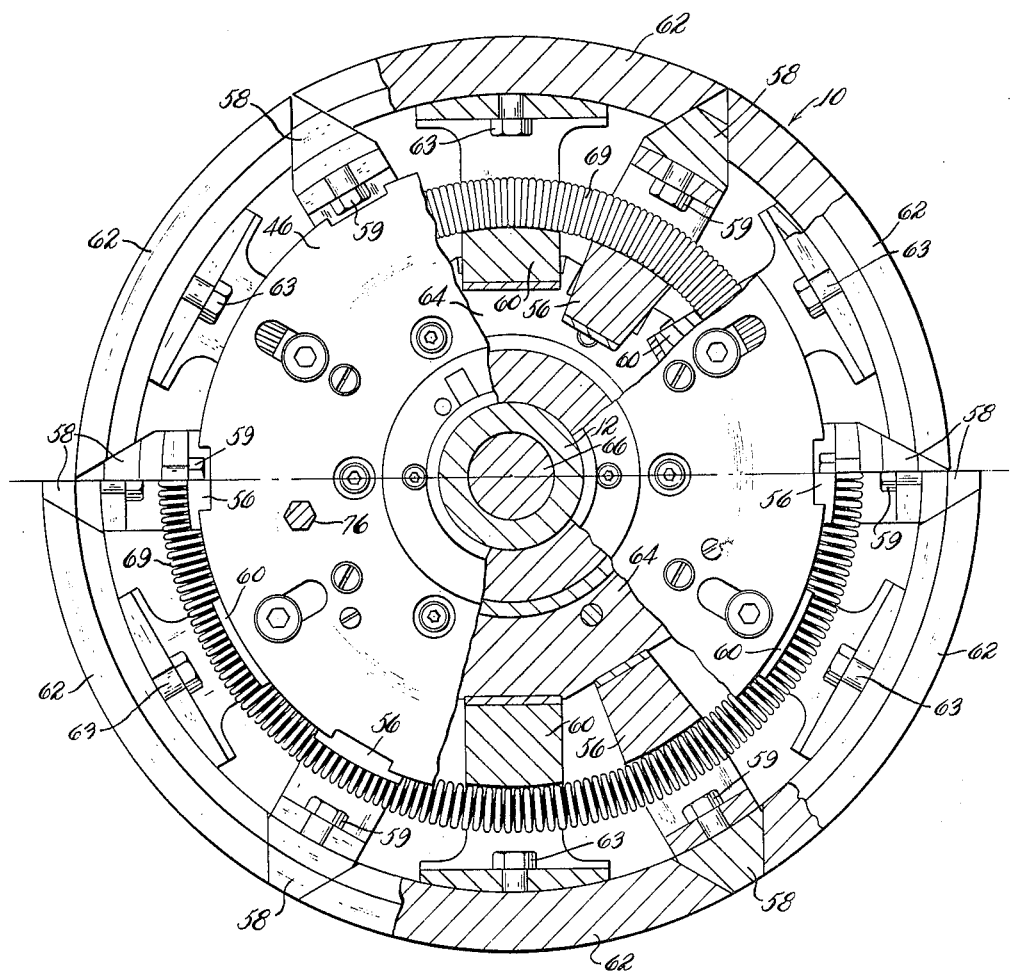
FIGURE 11 is a sectional view taken along line 11—11 of FIGURE 10, with parts broken away and with the portion of the drum above the centerline shown in contracted position and the portion below the centerline shown in expanded position.
Figure 12:
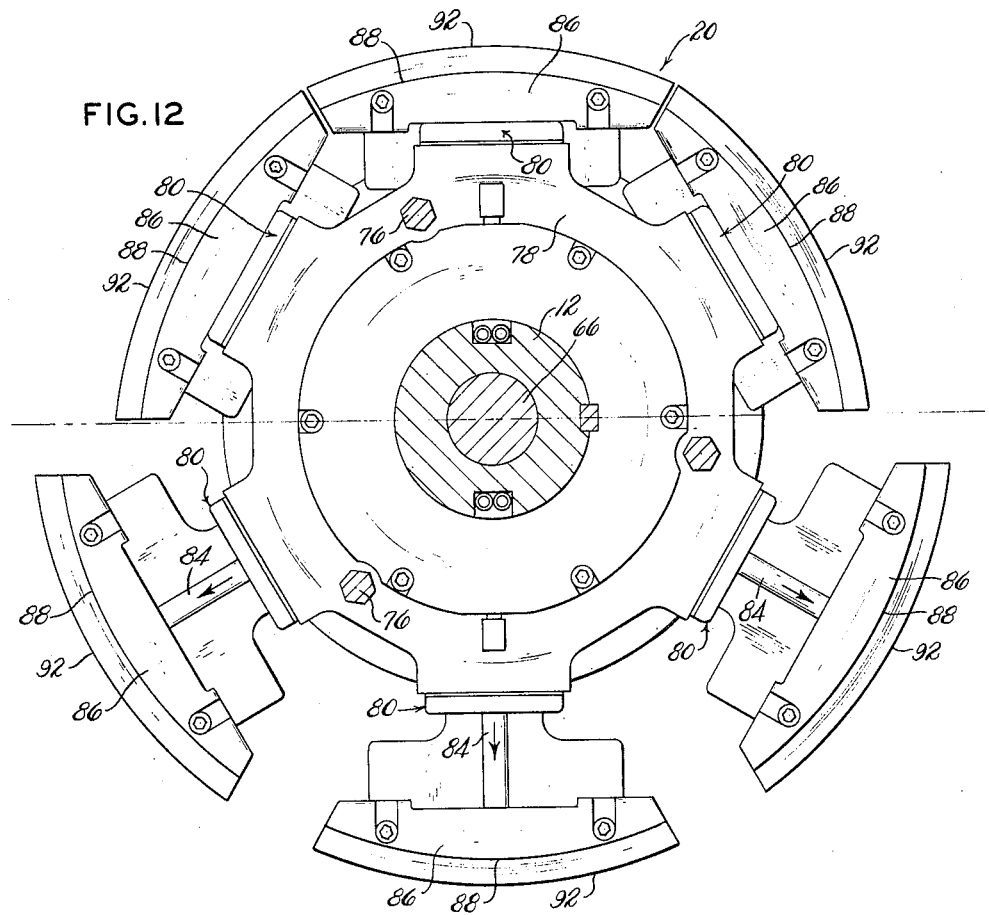
FIGURE 12 is a view taken along line 12—12 of FIGURE 10, with the portion of the drum above the centerline shown in contracted position and the portion below the centerline shown in expanded position.

The shaft 66 is reciprocated by conventional means, such as an air cylinder (not shown) within drive unit housing 14. As seen in the lower halves of FIGURES 9 and 10, extension of the shaft 66 moves cams 64, 64 axially to urge cam follower blocks 56 and 60, and drum segments 58 and 62, radially outwardly; upon contraction of shaft 66, pairs of garter springs 69, 69 return the blocks 56 and 60, and segments 58 and 62, to their contracted positions. Spring loaded balls 72 in end plates 44 and 46 cooperate with detents 74 in the lateral edges of end portions 50, 50 of hub 40 to maintain the blocks 56 and 60 in their contracted positions.

Mounted on shaft 12 at each edge of drum 10 and secured for rotation with each end plate 44 and 46 and spaced therefrom by spacers 76 are a plurality of circumferentially spaced bead register means 86, each comprised of a hub portion 78, a fluid-operated cylinder 80 within the hub portion 78 and having piston 82 and piston rod 84; secured to each piston rod 84 is a bead register segment 86 having an axial flange portion 88 which, upon outward motion of piston 82, registers with an axial recess 90 in drum segments 58 and 62. An axial tire bead support 92 is provided on each segment 86 and adjoins the edge of the drum 10.

Thus, as the bead register means is activated with the drum segments and the helper ring segments, the axial flanges 88 are placed positively against the inner axial recesses 90 of the drum; this places the axial bead support surfaces 92 in absolutely concentric relationship to the drum surface. Consequently, these bead support surfaces will force the bead into a true concentric location at the drum edge.

Drum segments 58 and 62 are removably secured to the hub 40 to permit interchangeability of segments, so that the drum may be changed in width to construct tires of various sizes.

By the same token, the spacers 76 between end plates 44 and 46 and the bead register ring segments 86 may be changed to alter the spacing therebetween; also, to accommodate different bead diameters, the ring segments comprising bead seats 92 may be made interchangeable.

Figure 13:
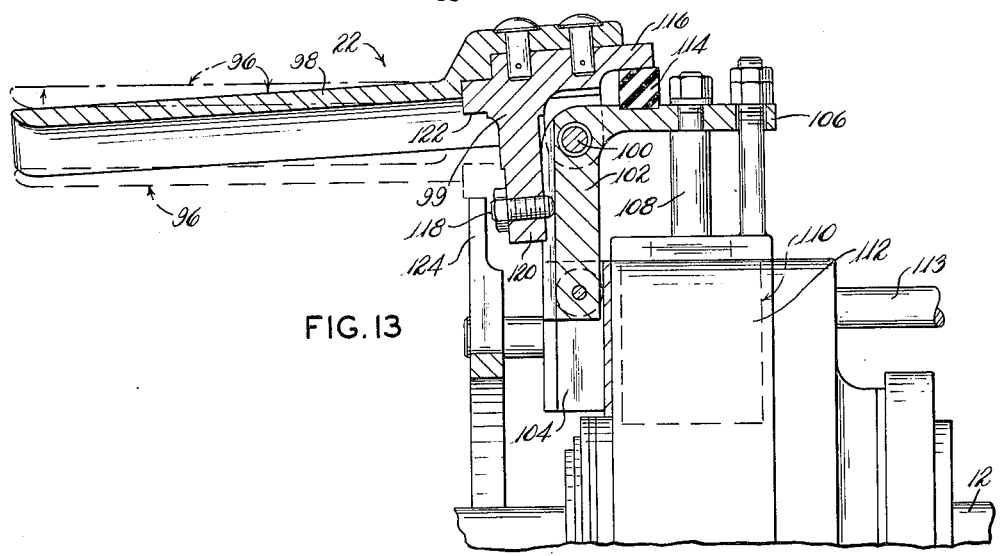
FIGURE 13 is an enlarged fragmentary longitudinal sectional view of one of the segments of the drum extension and ply turnover rings.

Each segment 96 of the helper means or ring assembly 22, as shown in FIGURE 13, comprises an arcuate, axially extending finger 98 secured to a bracket 99 mounted by a pivot 100 on a support 102 slidable radially within a guide 104. Radial motion is imparted to finger 98 through an axial leg 106 on support 102 by piston rod 108 of cylinder 110 within a housing 112 rotatably mounted on shaft 12 and axially movable by piston rod 113 of a cylinder not shown. Biasing of finger 98 is provided by a resilient member 114 between leg 106 and an axial leg 116 on bracket 99. Adjustment of the finger 98 and the degree of resiliency of member 114 is provided by a screw 118 in a radial leg 120 on bracket 99 which bears against support 102.

At the start of the tire building operation, with the drum and helper ring assembly 22 contracted, the fingers 98 are held fixed in horizontal positions by engagement of seats 122 on brackets 99 with annular ring 124, as shown in dotted lines, FIGURE 13. When the fingers 98 are expanded radially to cooperate with the registering ring segments 86, they are biased in the slanted position shown in full lines in FIGURE 13 by the resilient members 114 urging the axially outer ends radially outwardly about pivot 100.

During the ply turnover and stitching operation, the axially inner ends of fingers 98 are pivoted radially outwardly by engagement with the tire body on the drum, as indicated by the dot-dash lines in FIGURE 13. This pivotal motion of the fingers 98 is resisted by the resilient members 114, thereby providing improved stitching of the ply material around the tire beads.

After the tread T has been placed on the tire body, with fingers 98 still in position, high speed rotation of the tire drum and helper ring assembly 22 impart to the inner ends of fingers 98 a tendency to rise radially, thus helping to hold the edges of tread T away from the underlying tire body, as the assembly is removed axially ahead of the stitchers 24. This spacing of the tread edges prevents entrapment of air between tread and tire body.

While one form of the invention has been shown and described, various modifications will occur to those skilled in the art without departing from the scope of the invention as defined in the appended claims.

What is claimed is:

1. Apparatus for building a precision tire, comprising a rotatable tire building drum 10, means 18 to place tire beads B over a tire body P and axially accurately at the end of said drum, bead register means 20 at each end of said drum expansible radially to engage said drum and locate the tire beads concentrically with said tire building drum, a helper ring assembly housing 112 adapted to be rotated with said drum, supports 102 radially movably mounted on said housing, means 110 to move each said support radially, a bracket 99 pivotally mounted on each said support, an axial arcuate finger 96 on each said bracket, and biasing means 114 between said bracket and said support.

2. Apparatus for building a precision tire, comprising a rotatable shaft, an axially translatable shaft carried coaxially of said rotatable shaft, a piston connected to said translatable shaft for axial actuation thereof, a drum hub rotatably carried by said rotatable shaft, a plurality of arcuate drum shell segments radially slidably carried by said drum hub, cam surfaces connected to said drum shell segments radially inwardly thereof and adapted to be actuated by said axially translatable shaft to produce radial expansion of said drum shell segments, a pair of bead ring assemblies carried by said rotatable shaft, one at each end of said drum hub, said bead ring assemblies being radially expansible to engage said drum shell segments and locate tire beads concentrically with said drum shell segments in their radially expanded position, and a pair of helper ring assemblies carried by said rotatable shaft, one each being located axially outwardly of said bead ring assemblies, said helper ring assemblies being selectively axially translatable and radially expansible to support the ends of a tire body extending axially beyond said expanded drum shell segments, to turn the body ends around the beads, and to maintain the edges of a tread on the tire body radially spaced therefrom during the stitching of said tread.

3. In apparatus for building a precision tire and having a radially expansible tire building drum carried on a rotatable shaft; a pair of helper ring means carried by said rotatable shaft, one each being located axially outwardly of the ends of said drum, said helper ring means being selectively axially translatable and radially expansible to support the ends of a tire ply body extending axially beyond the said ends of said drum, to turn the tire ply body ends around tire beads when set thereon, and to maintain the edges of a tread on said tire ply body radially spaced therefrom during the stitching of said tread.

4. In apparatus for building a precision tire and having a tire building drum 10 mounted for rotation on a shaft 12 and means 18 to place tire beads B over a tire body P and axially accurately at the end of said drum, a radially expansible bead register ring assembly 20 comprising; a hub member 78 mounted on said shaft 12 at the edge of said drum 10 and secured for rotation therewith, a plurality of fluid-operated cylinders 80 within said hub member, a piston rod 84 in each said cylinder adapted for extension radially of said shaft, an arcuate bead register segment 86 at the radially outer end of each said piston rod, an axial flange portion 88 on each said bead register segment for radial registry with an inner edge 90 of said drum, and an axially directed tire bead support surface 92 on each said bead register segment adapted to axially adjoin the radially outer edge surface of said drum.

5. In apparatus for building a precision tire including a rotatable tire building drum; a helper ring assembly housing mounted axially outwardly of said drum and adapted to be translated axially of said drum, finger supports radially movably mounted on said housing, a mechanism to move each said support radially with respect to said drum, an arcuate finger mounted on each said finger support, said finger extending axially inwardly toward said drum and being streamlined at its axially inner extremities for selective positioning over the radially outer extremities of said drum to maintain the edges of a tread radially spaced from a tire ply body during the stitching of said tread.

6. In apparatus for building a precision tire on a rotatable tire building drum, a helper ring assembly comprising; housing means adapted to be translated axially of said drum, finger support means radially movably mounted on said housing means, axially extending arcuate finger means mounted on each said support means, and means for axially translating said housing means and radially expanding said finger means to maintain the edges of a tread on a tire ply body radially spaced therefrom during the stitching of said tread.

7. In apparatus for building a precision tire on a rotatable tire building drum, a helper ring assembly, according to claim 6, wherein said means for axially translating said housing means and radially expanding said finger means are adapted selectively to support the ends of a tire ply body extending axially beyond the ends of said drum and to turn the tire ply body ends around tire beads when set on said drum.

8. In apparatus for building a precision tire and having a radially expansible tire building drum carried on a rotatable shaft; a pair of helper ring means carried by said rotatable shaft, one each being located axially outwardly of the ends of said drum, said helper ring means being selectively and sequentially axially translatable and then radially expansible while axially stationary, to support the ends of a tire ply body extending axially beyond the said ends of said drum, to turn the tire ply body ends around tire beads when set thereon, and to maintain the edges of a tread on said tire ply body radially spaced therefrom during the stitching of said tread.

9. In apparatus for building a precision tire and having a radially expansible tire building drum carried on a rotatable shaft; a pair of helper ring means carried by said rotatable shaft, one each being located axially outwardly of the ends of said drum, said helper ring means having pivotal finger means pivoted thereon so that said finger means may be selectively rotated radially, said finger means being selectively axially translatable and radially expansible to support the ends of a tire ply body extending axially beyond the said ends of said drum, to turn the tire ply body ends around tire beads when set thereon, and to maintain the edges of a tread on said tire ply body radially spaced therefrom during the stitching of said tread.

10. In apparatus for building a precision tire, according to claim 9, a pair of helper ring means wherein said means include biasing means urging said pivotal finger means radially inwardly.

11. In apparatus for building a precision tire and having a radially expansible tire building drum carried on a rotatable shaft; a pair of helper ring assemblies carried by said rotatable shaft, one each being located axially outwardly of the ends of said drum, said helper ring assemblies having radially inwardly biased pivotal fingers thereon, said fingers being selectively axially translatable and radially expansible while axially stationary, to support the ends of a tire ply body extending axially beyond the said ends of said drum, to turn the tire ply body ends around tire beads when set thereon, and to maintain the edges of a tread on said tire ply body radially spaced therefrom during the stitching of said tread.

References Cited by the Examiner

UNITED STATES PATENTS

| | | | |
|---|---|---|---|
| 2,367,831 | 1/1945 | Manson | 156—415 |
| 2,455,038 | 11/1948 | Breth | 156—403 XR |
| 2,614,952 | 10/1952 | Kraft | 156—403 XR |
| 2,655,977 | 10/1953 | Hodgkins | 156—415 XR |
| 2,715,933 | 8/1955 | Frazier | 156—401 XR |
| 2,971,562 | 2/1961 | Hollis | 156—400 XR |
| 3,016,321 | 1/1962 | Beckadolph et al. | 156—403 XR |
| 3,017,919 | 1/1962 | McMahon et al. | 156—400 |
| 3,093,531 | 6/1963 | Frohlich et al. | 156—400 |
| 3,121,652 | 2/1964 | Borglin et al. | 156—400 |

EARL M. BERGERT, *Primary Examiner.*